United States Patent
Muramatsu et al.

(10) Patent No.: US 9,333,804 B2
(45) Date of Patent: May 10, 2016

(54) PNEUMATIC TIRE FOR TWO-WHEELED VEHICLE

(75) Inventors: Naoya Muramatsu, Kodaira (JP); Tooru Ubukata, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 28 days.

(21) Appl. No.: 13/819,176

(22) PCT Filed: Aug. 26, 2011

(86) PCT No.: PCT/JP2011/069313
§ 371 (c)(1),
(2), (4) Date: Feb. 26, 2013

(87) PCT Pub. No.: WO2012/026588
PCT Pub. Date: Mar. 1, 2012

(65) Prior Publication Data
US 2013/0153111 A1  Jun. 20, 2013

(30) Foreign Application Priority Data
Aug. 27, 2010  (JP) .................................. 2010-190904

(51) Int. Cl.
*B60C 11/00* (2006.01)
*B60C 1/00* (2006.01)
(Continued)

(52) U.S. Cl.
CPC ... *B60C 9/22* (2013.01); *B60C 9/18* (2013.01); *B60C 11/00* (2013.01); *B60C 11/005* (2013.01);
(Continued)

(58) Field of Classification Search
CPC .............. B60C 11/0041; B60C 11/005; B60C 11/0058; B60C 11/0066; B60C 11/0075
USPC ........................................ 152/209.5, 209.11
See application file for complete search history.

(56) References Cited

U.S. PATENT DOCUMENTS

2006/0207701 A1* 9/2006 Tanaka ....................... 152/209.5
2010/0024945 A1  2/2010 Ishiyama
(Continued)

FOREIGN PATENT DOCUMENTS

CN  101500824 A  8/2009
CN  101563240 A  10/2009
(Continued)

OTHER PUBLICATIONS

Machine Translation: JP2002-059709; Kuwabara, Takao; (No Date).*
(Continued)

*Primary Examiner* — Michael H Wilson
*Assistant Examiner* — Kendra Ly
(74) *Attorney, Agent, or Firm* — Sughrue Mion, PLLC

(57) ABSTRACT

Provided is a pneumatic tire for a motorcycle which does not produce a failure such as early wear or uneven wear and which has improved grip while turning.
The pneumatic tire for a motorcycle is a pneumatic tire for a motorcycle including a ring-shaped tread portion. The tire has, inside in the tire radial direction of the crown portion, at least one spiral belt layer having a width narrower than the width of the tread portion; at the shoulder portion of the tread portion, an inner layer rubber having a smaller modulus at 300% elongation at room temperature than that of a surface layer rubber is arranged; the inner layer rubber extends to a buttress portion; and the range of the ratio of the moduli between the inner layer rubber and the surface layer rubber is from 0.3 to 0.9.

4 Claims, 2 Drawing Sheets

(51) Int. Cl.
*B60C 9/22* (2006.01)
*B60C 9/18* (2006.01)

(52) U.S. Cl.
CPC ......... *B60C 11/0075* (2013.04); *B60C 11/0041* (2013.04); *B60C 2011/0025* (2013.04); *B60C 2011/016* (2013.04); *B60C 2011/0334* (2013.04); *B60C 2200/10* (2013.04)

(56) References Cited

U.S. PATENT DOCUMENTS

| 2010/0163144 A1 | 7/2010 | Nakagawa |
| 2011/0277899 A1 | 11/2011 | Tomita |

FOREIGN PATENT DOCUMENTS

| JP | 62-265005 A | | 11/1987 | | |
| JP | S63-240404 A | | 10/1988 | | |
| JP | 8-332806 A | | 12/1996 | | |
| JP | 08332806 A | * | 12/1996 | | |
| JP | 2002059709 A | * | 2/2002 | ............. | B60C 11/00 |
| JP | 2002-337512 A | | 11/2002 | | |
| JP | 2007223569 A | * | 9/2007 | | |
| JP | 2007-283803 A | | 11/2007 | | |
| JP | 2007-290533 A | | 11/2007 | | |
| JP | 2007-290537 A | | 11/2007 | | |
| JP | 2008044448 A | * | 2/2008 | ............. | B60C 11/00 |
| JP | 2008149991 A | * | 7/2008 | ................ | B60C 9/18 |
| JP | 2009-51426 A | | 3/2009 | | |
| JP | 2009-56899 A | | 3/2009 | | |
| JP | 2009-056900 A | | 3/2009 | | |
| JP | 2010274808 A | * | 12/2010 | | |
| WO | 2010/087190 A1 | | 8/2010 | | |

OTHER PUBLICATIONS

Machine Translation: JP2008-149991; Ishiyama, Makoto; (No Date).*
Machine Translation: JP 2008044448 A; Nakagawa, Eiko; no date.*
Machine Translation: JP 2010274808 A; Ito, Sumio; no date.*
Machine Translation: JP 2007223569 A; Kajimoto, Katsuhiko; no date.*
Machine Translation: JP 08332806 A; Kaneko, Takashi; no date.*
International Search Report of PCT/JP2011/069313 dated Nov. 15, 2011.
Extended European Search Report, dated Apr. 16, 2014, issued in corresponding European Patent Application No. 11820048.4.
Communication dated Feb. 27, 2015, issued by the State Intellectual Property Office of P.R. China in counterpart Chinese application No. 201180041364.9.
Communication dated Mar. 17, 2015, issued by the Japanese Patent Office in counterpart Japanese application No. 2012-530741.

* cited by examiner

PNEUMATIC TIRE FOR TWO-WHEELED VEHICLE

TECHNICAL FIELD

The present invention relates to a pneumatic tire for a motorcycle (hereinafter, also simply referred to as "a tire"), and specifically to a pneumatic tire which does not produce a failure such as early wear or uneven wear and which has improved grip while turning.

BACKGROUND ART

Since the rotational speed of a tire for a high performance motorcycle can be high, the tire will be largely affected by a centrifugal force, thereby expanding the tread portion of the tire outward, which may impair the steering stability. For this reason, a tire structure in which a reinforcing member (spiral member) made of organic fiber or steel is wound on the tread portion of a tire almost in parallel to the tire equatorial plane is being developed. As the reinforcing member spirally wound along the tire equatorial plane, a nylon fiber, an aromatic polyamide (aramid), steel or the like is used. Among others, an aromatic polyamide or steel does not extend even at a high temperature and can minimize the expansion of the tread portion of the tire; therefore the tire does not expand due to the centrifugal force even when the tire revolves at a high speed, whereby steering stability and durability can be improved.

Examples of a tire in which, by arranging a spiral belt layer in such a manner, the stiffness in the circumferential direction is increased, lift deformation at a high speed running is prevented, the traction performance is improved, and as the result the steering stability is further improved, includes a tire according to Patent Document 1.

However, a faster and higher output modern motorcycle had a problem of compatibility between the traction performance and the turn performance. To the center portion of a tread which is frequently used, a higher traction is applied due to a high output, and therefore, the traction performance needs to be secured by making the tread rubber have a high hardness. When a spiral belt layer is arranged or when the tread rubber is made to have a high hardness, however, the grip while turning was not necessarily satisfactory.

In order to solve the above problems, for example, in Patent Document 2, it is disclosed that, by dividing a tread rubber into three parts in the radial direction and replacing the whole rubber of the shoulder portion with the one with a low hardness compared with the rubber at the center portion, the contact length of the shoulder portion when turning at a large camber angle can be sufficiently extended. By this method, a contact area can be sufficiently secured and grip while turning can be improved.

RELATED ART DOCUMENTS

Patent Documents

Patent Document 1: Japanese Unexamined Patent Application Publication No. 2007-283803
Patent Document 2: Japanese Unexamined Patent Application Publication No. 2007-290537

SUMMARY OF THE INVENTION

Problems to be Solved by the Invention

However, as in a method described in Patent Document 2, when the whole of the rubber of the shoulder portion is replaced with the one with a low hardness, the grip while turning at the beginning of usage of the tire is improved although the early wear and uneven wear are not sufficiently improved, and therefore, a further improvement has been desired.

Accordingly, an object of the present invention is to provide a pneumatic tire for a motorcycle which does not produce a failure such as early wear or uneven wear and which has improved grip while turning.

Means for Solving the Problems

In order to solve the above-mentioned problems, the present inventors intensively studied to find that the problems can be solved by employing the constitution below, thereby completing the present invention.

Namely, the pneumatic tire for a motorcycle of the present invention is a pneumatic tire for a motorcycle comprising a ring-shaped tread portion characterized in that the tire comprises, inside in the tire radial direction of the crown portion, at least one spiral belt layer having a width narrower than the width of the tread portion; at the shoulder portion of the tread portion, an inner layer rubber having a smaller modulus at 300% elongation at room temperature than that of a surface layer rubber is arranged; the inner layer rubber extends to a buttress portion; and the range of the ratio of the moduli between the inner layer rubber and the surface layer rubber is from 0.3 to 0.9. Here, the room temperature refers to the value (23±2° C.) according to JIS K 6250. The modulus at 300% elongation refers to the tension stress of a vulcanized rubber sheet at 300% elongation in a tension test according to JIS K 6251.

In the present invention, preferably, the modulus of the inner layer rubber is from 2.0 MPa to 10.0 MPa, and the modulus of the surface layer rubber is from 5.0 MPa to 15.0 MPa. Further, in the present invention, preferably, the inner layer rubber is arranged outside in the tire width direction from ½ of the half-width of the tread portion from the tire equator. Still further, in the present invention, preferably, the thickness of the inner layer rubber at the tread portion is from 40% to 80% of the total thickness of the tread portion. Still further, in the present invention, preferably, the width of the spiral belt layer is from 50% to 90% of the width the tread portion; and the end portion of the spiral belt layer is arranged adjacent to the inner layer rubber.

Effect of the Invention

By the present invention, a pneumatic tire for a motorcycle which does not produce a failure such as early wear or uneven wear and which has improved grip while turning can be provided.

MODES FOR CARRYING OUT THE INVENTION

Embodiments of the present invention will now be described in detail with reference to the drawings.

Figure 1:
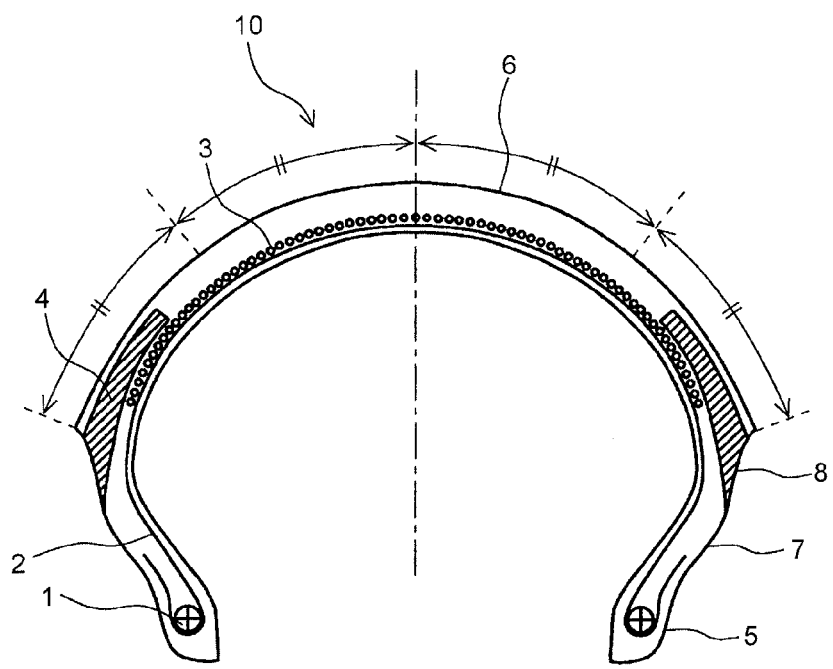
FIG. 1 is a cross-sectional view of a pneumatic tire for a motorcycle according to one preferred embodiment of the present invention.

FIG. 1 is a cross-sectional view of a pneumatic tire for a motorcycle according to one preferred embodiment of the present invention. As illustrated, a pneumatic tire for a motorcycle 10 of the present invention has a carcass 2 which is turned up to be engaged around bead cores 1 each embedded at a pair of bead portions 5, as a skeleton, and includes a tread portion 6 arranged at the outer circumference of the crown portion of the carcass 2 and a pair of sidewall portions 7 which extend inward in the tire radial direction from the both ends of the carcass 2. On the outside of the carcass 2 in the tread portion 6 in the tire radial direction, at least one spiral belt layer 3 composed of a rubber coated cord wound spirally in the circumferential direction is arranged.

In the present invention, the width of the spiral belt layer 3 is narrower than the width of the tread portion 6. By making the width of the spiral belt layer 3 narrower than the width of the tread portion 6, the shoulder portion is likely to bend while turning. As the result, the contact area can be sufficiently secured while turning and the grip can be improved.

In the present invention, at the shoulder portion of the tread portion 6, an inner layer rubber 4 having a smaller modulus at 300% elongation at room temperature (300% modulus (room temperature)) than that of the surface layer rubber is arranged; the inner layer rubber 4 extends to a buttress portion 8; the ratio of moduli between the inner layer rubber 4 and the surface layer rubber is in a range from 0.3 to 0.9, and preferably from 0.5 to 0.7. By arranging on the shoulder portion, the inner layer rubber 4 having a 300% modulus (room temperature) smaller than that of the surface layer rubber, it is possible to further improve the grip while turning. At the same time, the warm-up performance improves. Here, the term "warm-up performance" means the quickness of warm-up of a tire; the higher the warm-up performance, the better improves the grip performance. Further, by arranging a rubber having a small 300% modulus (room temperature) only inside the shoulder portion, the problem of early wear and uneven wear on a contact surface can be avoided. In order to favorably achieve the above-mentioned effect, the ratio of 300% moduli (room temperature) between the inner layer rubber 4 and the surface layer rubber is in a range of from 0.3 to 0.9. Specifically, it is preferable that the 300% modulus (room temperature) of the inner layer rubber 4 is from 2.0 MPa to 10.0 MPa, and the 300% modulus (room temperature) of the surface layer rubber is from 5.0 MPa to 15.0 MPa. The composition of rubber to be used for the inner layer rubber 4 is not particularly restricted, as long as the above-mentioned requirement is satisfied in relation to the surface layer rubber.

Still further, in the present invention, the inner layer rubber 4 extends to a buttress portion 8. When the inner layer rubber 4 does not extend to the buttress portion 8, the stiffness of the end portion of the shoulder portion cannot be reduced and the grip while turning cannot be improved. It is therefore demanded that the inner layer rubber 8 arranged at the shoulder portion extend to the buttress portion 8.

Further, in the pneumatic tire for a motorcycle 10 of the present invention, it is preferable that the inner layer rubber 4 is arranged outside in the tire width direction from ½ of the half-width of the tread portion 6 from the tire equator. Since the inside portion in the tire width direction from ½ of the half-width of the tread portion 6 from the tire equator is an area where a high traction is applied, when the inner layer rubber 4 is arranged on the area, the hardness of the tread rubber is reduced and the traction performance and the steering stability may be reduced.

Still further, in the pneumatic tire for a motorcycle 10 of the present invention, it is preferable that the thickness of the inner layer rubber 4 in the tread portion 6 is from 40% to 80% of the total thickness of the tread portion 6. When the thickness of the inner layer rubber 4 is over 80% of the total thickness of the tread portion 6, the inner layer rubber 4 may be exposed due to wear of tread portion 6 while running, which is not preferable. On the other hand, when the thickness is smaller than 40%, the inner layer rubber 4 may have small effect on the grip performance, which is still not preferable.

Figure 2:
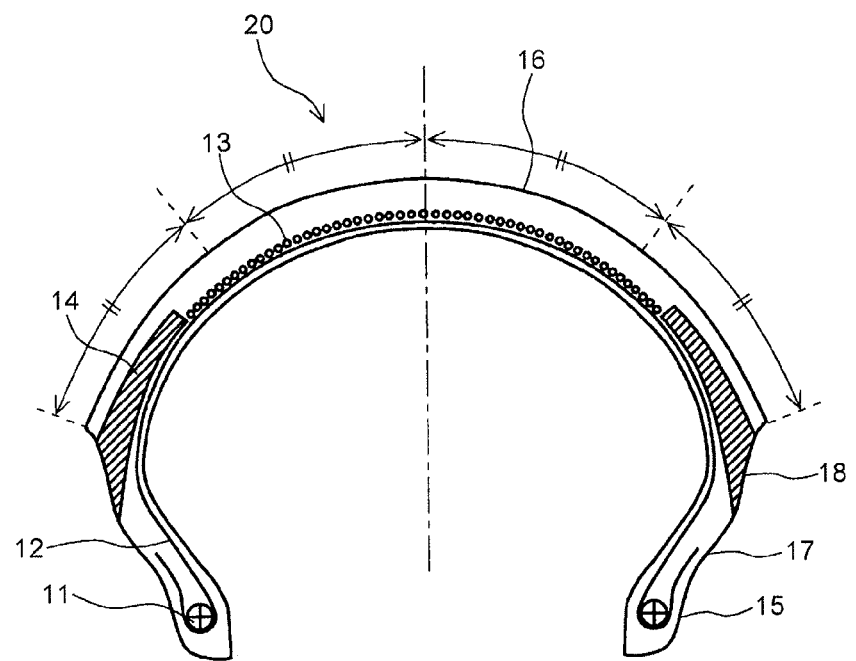
FIG. 2 is a cross-sectional view of a pneumatic tire for a motorcycle according to another preferred embodiment of the present invention.

In a pneumatic tire for a motorcycle of the present invention, it is preferable that the width of the spiral belt layer is from 50% to 90% of the width of the tread portion, and that the inner layer rubber is arranged adjacent to the end portion of the spiral belt layer. The cross-sectional view of a tire having such a structure is shown in FIG. 2. As illustrated, a tire 20 has a carcass 12 which is turned up to be engaged around bead cores 11 each embedded at a pair of bead portions 15, as a skeleton, and includes a tread portion 16 arranged at the outer circumference of the crown portion of the carcass 12 and a pair of sidewall portions 17 which extend inward in the tire radial direction from the both ends of the carcass 12. On the outside of the carcass 12 in the tread portion 16 in the tire radial direction, at least one spiral belt layer 13 composed of a rubber coated cord wound spirally in the circumferential direction is arranged. As mentioned above, the width of the spiral belt layer 13 is from 50% to 90% of the width of the tread portion 16, and as illustrated, when an inner layer rubber 14 is arranged adjacent to the end portion of the spiral belt layer 13 and extends to a buttress portion 18, the grip improves and the effect of the present invention can be favorably achieved.

The spiral belt layers 3 and 13 are formed by spirally winding an elongate rubber-coated cord which is obtained by coating one cord with rubber or a strip-shaped ply obtained by coating a plurality of cords with rubber, and formed such that the cord direction is substantially the tire circumferential direction. As the cord, a steel cord as well as an organic fiber such as aramid (for example, manufactured by Du Pont; trade name: Kevlar) which is an aromatic polyamide, polyethylene naphthalate (PEN), polyethylene terephthalate (PET), rayon, Xyron (registered trademark) (polyparaphenylene benzo-bis-oxazol (PBO) fiber) or nylon which is an aliphatic polyamide and further, materials such as glass fiber or carbon fiber can be appropriately selected to be employed. In the illustrated example, although the spiral belt layers 3 and 13 are provided as an outermost belt layer, one or more belt layers can be further provided on the outside of the spiral belt layers 3 and 13 in the tire radial direction, as needed.

As illustrated in FIG. 1, in the pneumatic tire for a motorcycle 10 of the present invention, what is only important is that the tire 10 comprises, inside in the tire radial direction of the crown portion, at least one spiral belt layer 3 having a width narrower than the width of the tread portion 6; at the shoulder portion of the tread portion 6, an inner layer rubber 4 having a 300% modulus (room temperature) smaller than that of a surface layer rubber is arranged; the inner layer rubber 4 extends to a buttress portion 8; and the range of the ratio of the moduli between the inner layer rubber 4 and the surface layer rubber is from 0.3 to 0.9. The pneumatic tire for a motorcycle 10 of the present invention is not particularly restricted to the other structures or materials.

For example, the carcass 2 which is the skeleton of the tire of the present invention is composed of at least one carcass ply formed by arraying textile cords having a relatively high elasticity in parallel to one another. The number of carcass plies may be 1, 2, 3 or more. The both end portions of the carcass 2 may be turned up from the inside of the tire to the outside of the tire around the bead core 1 as illustrated in FIG. 1 or the like to be engaged, or may be sandwiched by bead wires between the both sides to be engaged (not illustrated).

Both fixation methods may be employed. On the innermost layer of the tire, an inner liner is arranged (not illustrated), and on the surface of the tread portion 6, a tread pattern is appropriately formed (not illustrated).

EXAMPLES

The present invention will now be described specifically by way of Examples.

Example 1

A pneumatic tire for a motorcycle having a cross-section structure of a type shown in FIG. 1 was manufactured with the tire size of 190/50ZR17. The half-width of the spiral belt layer 3 was 80% of the width from the tire equator to the end portion of the tread portion 6. The inner layer rubber 4 extended from the position of 60% of the width from the tire equator to the end of the tread portion 6 to the buttress portion 8. The ratio of 300% moduli (room temperature) between the inner layer rubber 4 and the surface layer rubber was 0.6, and the thickness of the inner layer rubber 4 was 0.6 times the total thickness of the tread portion 6. The 300% moduli (room temperature) of the inner layer rubber 4 and the surface layer rubber were measured at 23±2° C. by a tension test according to JIS K 6251.

Example 2

A pneumatic tire for a motorcycle having a cross-section structure of a type shown in FIG. 2 was manufactured with the tire size of 190/50ZR17. The half-width of the spiral belt layer 13 was 60% of the width from the tire equator to the end portion of the tread portion 16. The inner layer rubber 14 was arranged adjacent to the spiral belt layer 13 and extended to the buttress portion 18. The other conditions were the same as in Example 1.

Comparative Example 1

The constitution in Comparative Example 1 was the same as the tire of Example 1 except that the modulus value of the inner layer rubber was higher than that in Example 1 and the ratio of moduli between the inner layer and the surface layer was 0.95.

Comparative Example 2

The constitution in Comparative Example 2 was the same as the tire of Example 1 except that the modulus value of the inner layer rubber was lower than that in Example 1 and the ratio of moduli between the inner layer and the surface layer was 0.20.

Conventional Example

The constitution of Conventional Example was the same as the tire of Example 1 except that the inner layer rubber was not arranged.

<Steering Stability Evaluation>

Each test tire of Examples 1 and 2, Comparative Examples 1 and 2 and Conventional Example was applied to a rear wheel (rim: MT 6.00×17 inch, internal pressure: 290 kPa) of a commercially available motorcycle and evaluated in accordance with the procedure below for the items of the wear resistance, the grip performance while turning and the warm-up performance.

<Wear Resistance>

Before performing the above-mentioned test using a real motorcycle, the weight of the tire was measured; and thereafter, after 15 laps of a test course, extraneous matters attached to the tire such as rubber debris and pebbles were removed to measure the weight of the tire and to evaluate the weight difference from a new tire as the abrasion loss. The obtained results were also listed on the Table 1 below as indices taking the Conventional Example as 100. The higher the value, the better the performance.

<Grip Performance while Turning and Warm-Up Performance>

The grip performance while turning and the warm-up performance were evaluated by a rider's feeling test. The obtained results are listed on the Table 1 below as indices taking the Conventional Example as 100. The higher the value, the better the performance.

TABLE 1

| | | Example 1 | Example 2 | Comparative Example 1 | Comparative Example 2 | Conventional Example |
|---|---|---|---|---|---|---|
| spiral belt width/tread width ratio | | 0.80 | 0.60 | 0.80 | 0.80 | 0.80 |
| inner layer rubber modulus (MPa)*1 | | 6.0 | 6.0 | 9.5 | 2.0 | — |
| surface layer rubber modulus (MPa)*2 | | 10.0 | 10.0 | 10.0 | 10.0 | — |
| modulus ratio*3 | | 0.60 | 0.60 | 0.95 | 0.20 | — |
| inner layer rubber thickness/tread portion total thickness | | 0.60 | 0.60 | 0.60 | 060 | — |
| steering stability evaluation result | wear resistance (index) | 100 | 100 | 100 | 90 | 100 |
| | warm-up performance (index) | 110 | 110 | 100 | 115 | 100 |
| | grip performance while turning (index) | 110 | 120 | 100 | 100 | 100 |

*1 the 300% modulus of the inner layer rubber (room temperature)
*2 the 300% modulus of the surface layer rubber (room temperature)
*3 the 300% modulus of the inner layer rubber (room temperature)/the 300% modulus of the surface layer rubber (room temperature)

By the result in Table 1, it is found that in the tire of the present invention, the wear resistance is maintained, and at the same time, the grip performance while turning is improved.

DESCRIPTION OF THE REFERENCE NUMERALS 1, 11 bead core
2, 12 carcass
3, 13 spiral belt layer
4, 14 inner layer rubber
5, 15 bead portion
6, 16 tread portion
7, 17 sidewall portion
8, 18 buttress portion
10, 20 pneumatic tire for a motorcycle

The invention claimed is:

1. A pneumatic motorcycle tire comprising:
a ring-shaped tread portion, said tread portion having a cross-sectional shape that is substantially semicircular when viewed along a length of said tread portion;
at least one spiral belt layer disposed inside in the tire radial direction of a crown portion of the tire, said at least one spiral belt layer having a width narrower than the width of the tread portion; and
an inner layer rubber disposed at a shoulder portion of said tread portion, said inner layer rubber having a smaller modulus at 300% elongation at room temperature than that of a surface layer rubber; said inner layer rubber extending to a buttress portion of the tire; and a range of a ratio of moduli between said inner layer rubber and said surface layer rubber is from 0.3 to 0.9,
wherein said inner layer rubber is arranged only outside in the tire width direction from ½ of the half-width of said tread portion from the tire equator and exposed at the buttress portion of the tire, and
wherein the surface layer rubber entirely covers the radially outermost surface of said inner layer rubber.

2. The pneumatic motorcycle tire according to claim 1, wherein the modulus of said inner layer rubber is from 2.0 MPa to 10.0 MPa, and the modulus of said surface layer rubber is from 5.0 MPa to 15.0 MPa.

3. The pneumatic motorcycle tire according to claim 1, wherein the thickness of said inner layer rubber at said tread portion is from 40% to 80% of the total thickness of said tread portion.

4. The pneumatic motorcycle tire according to claim 1, wherein the width of said spiral belt layer is from 50% to 90% of the width of said tread portion and an end portion in the tire width direction of said spiral belt layer is arranged adjacent to said inner end in the tire width direction of said inner layer rubber.

* * * * *